US009701064B2

(12) United States Patent
Donaldson et al.

(10) Patent No.: US 9,701,064 B2
(45) Date of Patent: Jul. 11, 2017

(54) DIGITAL MANUFACTURING SYSTEM FOR PRINTING THREE-DIMENSIONAL OBJECTS ON A ROTATING CORE

(71) Applicant: Xerox Corporation, Norwalk, CT (US)

(72) Inventors: Patricia J. Donaldson, Pittsford, NY (US); Naveen Chopra, Oakville (CA); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 904 days.

(21) Appl. No.: 13/941,734

(22) Filed: Jul. 15, 2013

(65) Prior Publication Data
US 2015/0017272 A1 Jan. 15, 2015

(51) Int. Cl.
B29C 67/00 (2017.01)
B41J 3/407 (2006.01)
B41J 2/495 (2006.01)
B41J 2/125 (2006.01)
B22F 3/105 (2006.01)

(52) U.S. Cl.
CPC ...... B29C 67/0059 (2013.01); B29C 67/0077 (2013.01); B29C 67/0088 (2013.01); B29C 67/0092 (2013.01); B41J 2/125 (2013.01); B41J 2/495 (2013.01); B41J 3/4073 (2013.01); B22F 2003/1057 (2013.01)

(58) Field of Classification Search
CPC ............ B29C 67/0059; B29C 67/0088; B29C 67/0092; B29C 67/04; B29C 67/0077; B29C 41/085; B29C 41/04; B29C 41/042; B29C 41/045; B29C 41/047; B29C 41/52; B41J 3/4073; B41J 2/125; B41J 2/495; B33Y 50/02; B33Y 30/00; G05B 19/4099; B22F 2003/1057; B22F 2003/1058; B22F 2003/1056
See application file for complete search history.

(56) References Cited

U.S. PATENT DOCUMENTS 5,059,359 A 10/1991 Hull et al.
5,137,662 A 8/1992 Hull et al.
5,184,307 A 2/1993 Hull et al.
(Continued)

FOREIGN PATENT DOCUMENTS

JP 08138998 A * 5/1996

Primary Examiner — Yogendra Gupta
Assistant Examiner — Ninh Le
(74) Attorney, Agent, or Firm — Maginot Moore & Beck LLP

(57) ABSTRACT

A printer forms a three-dimensional object on a rotating substrate. The printer includes a frame that supports a cylindrical member and at least one printhead such that the first printhead is positioned to eject material onto an outer surface of the cylindrical member. The frame is movable between a first position that rotatably supports the cylindrical member and a second position that enables transfer of the cylindrical member to and from the frame. A controller operates the printhead to eject material onto the rotating cylindrical member to form the object. The controller interpolates a periodic signal generated from a position encoder to adjust the operation of the printhead based on the rotational position and velocity of the cylindrical member. The controller operates a driver to move the frame to the second position to enable removal of the cylindrical member from the printer.

18 Claims, 5 Drawing Sheets

(56) References Cited

U.S. PATENT DOCUMENTS

| | | | |
|---|---|---|---|
| 5,237,521 A * | 8/1993 | Raj | G01P 3/489 |
| | | | 377/18 |
| 5,345,391 A | 9/1994 | Hull et al. | |
| 5,617,911 A | 4/1997 | Sterett et al. | |
| 5,870,307 A | 2/1999 | Hull et al. | |
| 6,245,475 B1 * | 6/2001 | Scharfe | G03G 5/043 |
| | | | 427/424 |
| 6,264,873 B1 | 7/2001 | Gigl et al. | |
| 6,600,965 B1 | 7/2003 | Hull et al. | |
| 7,132,125 B2 * | 11/2006 | Hammond | B05C 5/0254 |
| | | | 118/107 |
| 7,261,542 B2 | 8/2007 | Hickerson et al. | |
| 7,550,518 B2 | 6/2009 | Bredt et al. | |
| 2003/0067097 A1 * | 4/2003 | Yu | B29C 71/0072 |
| | | | 264/345 |
| 2005/0238989 A1 * | 10/2005 | Kakui | B05C 1/0813 |
| | | | 430/133 |
| 2007/0172749 A1 * | 7/2007 | Carmichael | G03G 5/047 |
| | | | 430/58.8 |
| 2011/0024024 A1 * | 2/2011 | Pietrantoni | B29D 29/06 |
| | | | 156/137 |
| 2011/0233803 A1 * | 9/2011 | Hara | B29C 33/34 |
| | | | 264/40.1 |
| 2011/0316931 A1 | 12/2011 | Silverbrook | |

* cited by examiner

DIGITAL MANUFACTURING SYSTEM FOR PRINTING THREE-DIMENSIONAL OBJECTS ON A ROTATING CORE

TECHNICAL FIELD

The device disclosed in this document relates to three-dimensional printers generally and, more particularly, to devices for generating three-dimensional objects on moving surfaces.

BACKGROUND

Digital three-dimensional manufacturing, also known as digital additive manufacturing, is a process of making a three-dimensional solid object of virtually any shape from a digital model. Three-dimensional printing is achieved using an additive process in which successive layers of material are formed on a substrate in different shapes. Three-dimensional printing is distinguishable from traditional object-forming techniques, which mostly rely on the removal of material from a work piece by a subtractive process, such as cutting or drilling.

Existing three-dimensional systems, however, use production techniques that are slow and generate significant waste. The state of the art systems use a flat staging area onto which a single, scanning printhead slowly deposits layers of material to form the object. The printhead is typically substantially smaller than the stage and is scanned back and forth across the stage multiple times to form each layer of the object. The scanning motion is analogous to the manner in which a home inkjet printer operates and imposes severe constraints on the speed at which the three-dimensional printer can produce an object. Improvements to three-dimensional printers that eliminate the need to scan the printhead across the stage to form the object are desirable.

SUMMARY

A printer for generating a three-dimensional object has been developed. The printer includes a cylindrical member having an outer surface, a frame movable between a first position at which the frame rotatably supports the cylindrical member and a second position at which the frame is enabled for transfer of the cylindrical member to and from the frame, a first printhead mounted on the frame to enable the first printhead to eject material onto the outer surface of the cylindrical member, a first driver operatively connected to the cylindrical member to rotate the outer surface past the first printhead, a second driver operatively connected the frame to move the frame between the first position and the second position, and a controller operatively connected to the first printhead, the first driver, and the second driver, the controller being configured to operate the first driver to rotate the cylindrical member, operate the first printhead to eject material onto the outer surface of the cylindrical member and build layers of material on the cylindrical member as the outer surface rotates past the first printhead, and operate the second driver to move the frame from the first position to the second position to enable transfer of the cylindrical member to and from the frame.

BRIEF DESCRIPTION OF THE DRAWINGS

The foregoing aspects and other features of the three-dimensional printer are explained in the following description, taken in connection with the accompanying drawings.

DETAILED DESCRIPTION

Figure 1:
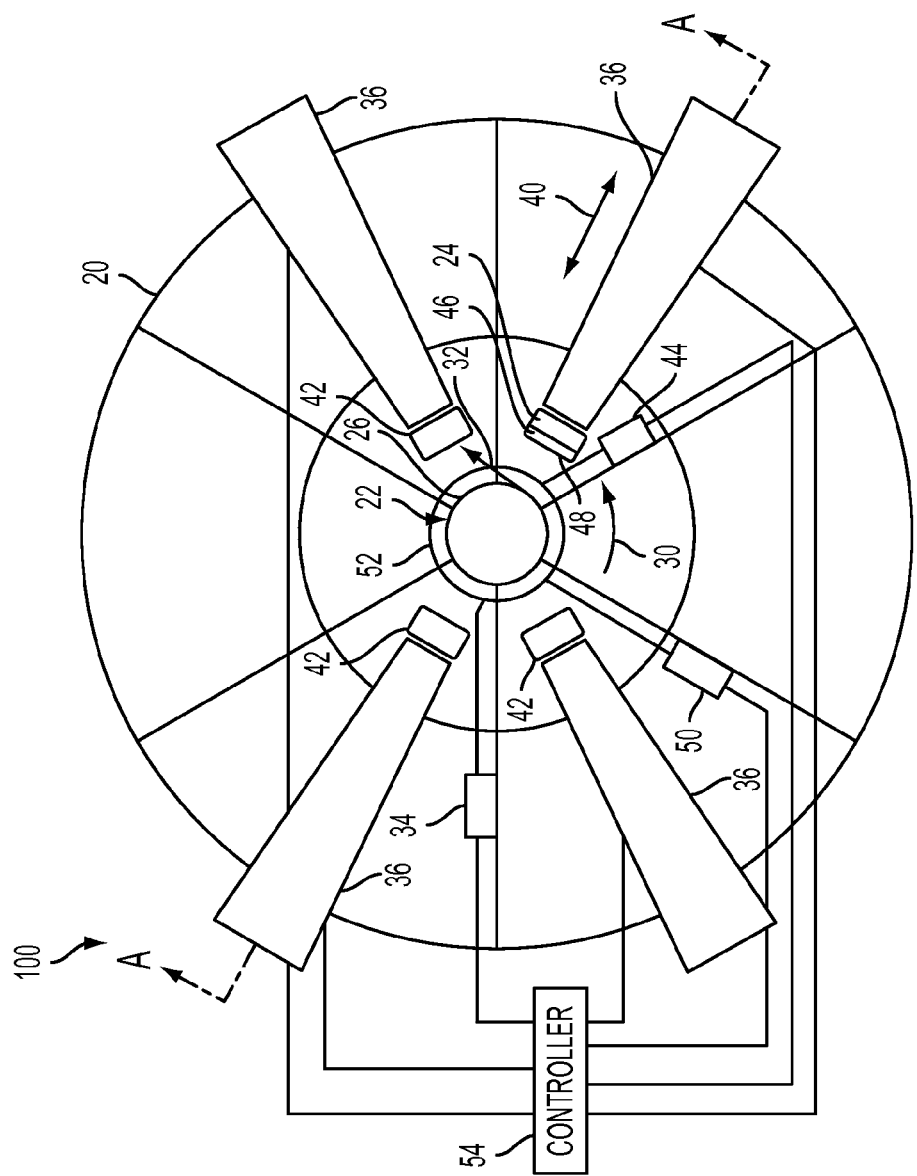
FIG. 1 is a side view of a printer for generating a three-dimensional object.

For a general understanding of the environment for the device disclosed herein as well as the details for the device, reference is made to the drawings. In the drawings, like reference numerals designate like elements. FIG. 1 shows a side view of a printer 100 for generating a three-dimensional object. The printer 100 includes a frame 20 configured to support a cylindrical member 22 and a first printhead 24 such that the first printhead 24 is positioned to eject material onto an outer surface 26 of the cylindrical member 22. The frame 20 is movable between a first position at which the frame 20 rotatably supports the cylindrical member 22 and a second position at which the frame 20 is enabled for transfer of the cylindrical member 22 to and from the frame 20. The movement of the frame 20 between the first and the second positions and the transfer of the cylindrical member 22 to and from the frame 20 are discussed in more detail below.

Figure 2:
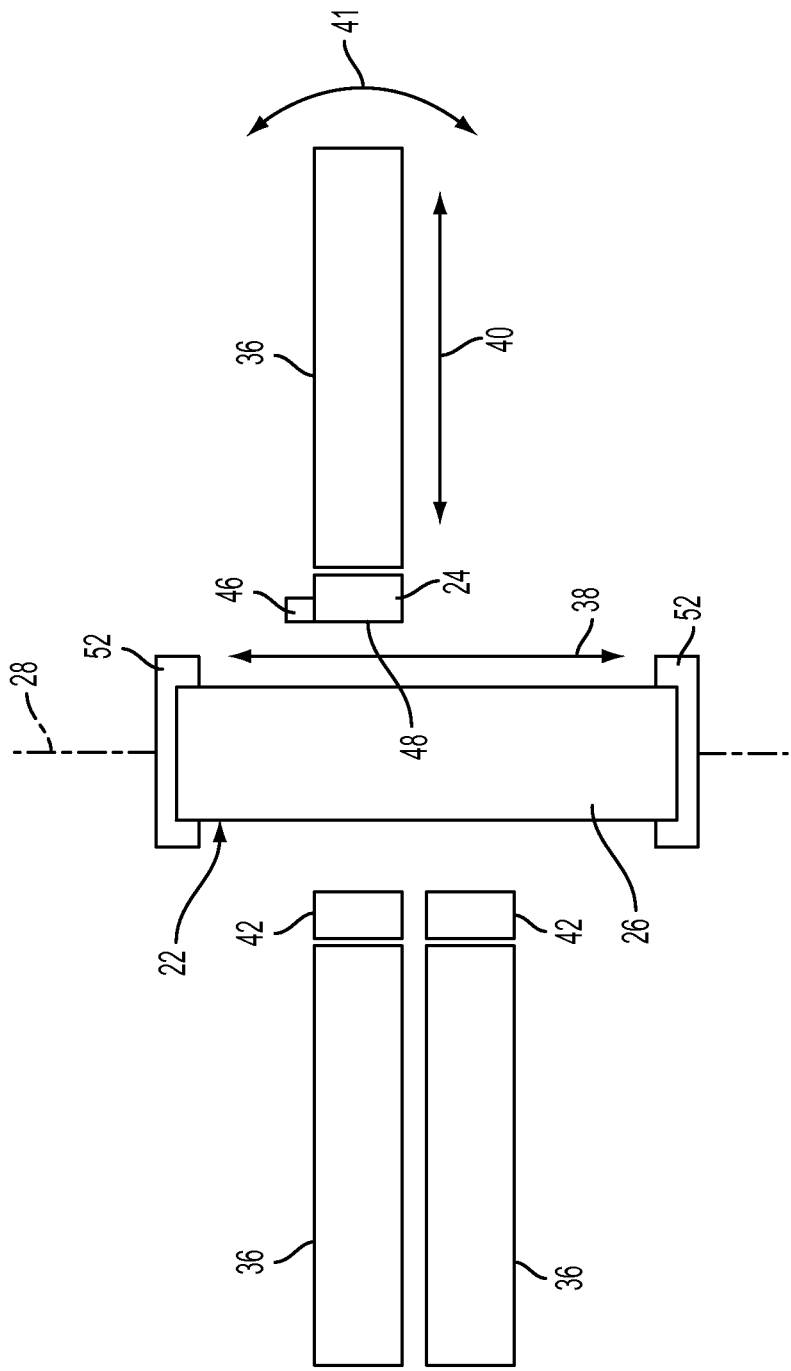
FIG. 2 is a partial section cut of the printer of FIG. 1 along line A-A showing an orientation of a rotating substrate and at least one printhead with respect to an axis of rotation of the substrate.

The frame 20 in the first position enables the outer surface 26 of the cylindrical member 22 to rotate about an axis 28 (FIG. 2). The cylindrical member 22 in some embodiments has a solid core, and in other embodiments, the cylindrical member 22 has a hollow core. The solid-core embodiment of the cylindrical member 22 and the hollow-core embodiment of the cylindrical member 22 are discussed in more detail below. A rotation of the cylindrical member 22 about the axis 28 (in the direction of arrow 30 in FIG. 1) causes a portion of the outer surface 26 to move past the first printhead 24 in a process direction 32. The placement of the first printhead 24 on the frame 20 enables the first printhead 24 to eject material onto the outer surface 26 of the cylindrical member 22 in a direction generally towards the axis 28. As used herein, the term "process direction" refers to a direction that is in the same direction as the tangential surface velocity of any position on the outer surface 26 of the cylindrical member 22 when the cylindrical member 22 is rotated about the axis 28.

The printer 100 further includes a first driver 34 operatively connected to the cylindrical member 22 and a third driver 36 operatively connected to the first printhead 24. The first driver 34 is configured to rotate the outer surface 26 of the cylindrical member 22 past the first printhead 24. In one embodiment the first driver 34 is an electromechanical motor configured to rotate the cylindrical member 22 via one or more motor-driven gears. In another embodiment, the first driver 34 is a magnetic drive system configured to rotate the cylindrical member 22 by generating a moving magnetic field. In a further embodiment, the first driver 34 is a pneumatic or hydraulic system configured to rotate the cylindrical member 22 by generating a pressure differential in pressure medium.

The third driver 36 is configured to move the position of the first printhead 24 relative to the outer surface 26 of the cylindrical member 22. In one embodiment, the third driver 36 moves the first printhead 24 in a direction that is approximately parallel with the outer surface 26 of cylindrical member 22. In some embodiments, the third driver 36 moves the first printhead 24 in a cross-process direction 38 (FIG. 2) across a width of the outer surface 26 of cylindrical member 22. As used herein, the term "cross-process direction" refers to a direction that is perpendicular to the process direction 32.

In another embodiment, the third driver 36 moves the first printhead 24 in a z-direction 40 that is generally towards or away from the outer surface 26 of the cylindrical member 22. The movement of the first printhead 24 in the z-direction 40 enables the first printhead 24 to maintain a constant distance or gap from the outer surface 26 or the layer of ejected material most distant from the outer surface 26 of the cylindrical member 22. The orientation of the z-direction 40 and the outer surface 26 of the cylindrical member 22 with respect to the axis 28 is discussed in more detail below.

The first printhead 24 in one embodiment is a full-width printhead that is capable of ejecting material across the full width of the cylindrical member 22 in the cross-process direction 38. In another embodiment, the printer 100 includes one or more additional full-width printheads 42 mounted on the frame 20 to enable each of the additional printheads 42 to eject material onto the cylindrical member 22 as the outer surface 26 rotates past each of the additional printheads 42. The first printhead 24 and the additional printheads 42 in this embodiment are spaced from one another in a circumferential direction defined by the rotation of the cylindrical member 22. The multiple lines of printheads 24, 42 formed by the circumferential spacing enable the printheads 24, 42 to form three-dimensional objects at faster process speeds and to eject one or more different types of material with varying properties, such as color, conductivity, etc. The ejection of different types of material from the multiple lines of printheads 24, 42 enables the printer 100 to form complex parts by ejecting the various types of material on the same or different layers to build the three-dimensional object.

The first printhead 24 in another embodiment is a partial-width printhead capable of ejecting material across a portion of the width of the cylindrical member 22 in the cross-process direction 38. The first printhead 24 in this embodiment is translated parallel to the outer surface 26 in the cross-process direction 38 to enable the first printhead 24 to eject material across the width of the cylindrical member 22. In some embodiments, the translation of the first printhead 24 in the cross-process direction 38 enables the printer to form multiple discrete or contiguous perpendicular rings of material on the outer surface 26 of the cylindrical member 22. In other embodiments, the translation of the first printhead 24 in the cross-process direction 38 enables the printer 100 to form a spiral or barber pole pattern of material on the outer surface 26 of the cylindrical member 22. In another embodiment in which the first printhead 24 is a partial-width printhead, the printer 100 includes one or more additional partial-width printheads 42 mounted on the frame 20 and positioned adjacent to the first printhead 24. The first printhead 24 and the one or more additional printheads 42 are arranged to eject material seamlessly across the full width of the cylindrical member 22 in the cross-process direction 38.

The printer 100 can include one or more lines of partial-width printheads or one or more lines of full-width printheads spaced in the circumferential direction to eject the same or different types of material from the respective lines of printheads.

In one embodiment, the printer 100 has at least one multi-channel printhead that enables the printer 100 to eject one or more different types of materials from the multi-channel printhead onto the cylindrical member 22. The multi-channel printhead in one embodiment is configured to eject one or more of a polylactic acid (PLA) material, a nylon material, an acrylonitrile butadiene styrene (ABS) material, and metal particles from a first channel onto the outer surface 26 of the cylindrical member 22. The multi-channel printhead is further configured to eject a removable support scaffold from a second channel onto the cylindrical member 22 or onto one or more layers of material ejected onto the cylindrical member 22. The ejected support scaffold in one embodiment is removable by one or more subtractive processes, including, but not limited to, abrading, cutting, and grinding. In another embodiment, the ejected support scaffold is removable via a chemical or thermal dissolution process.

FIG. 2 shows a partial section cut of the printer 100 of FIG. 1 along line A-A to illustrate the orientation of outer surface 26 of the cylindrical member 22 and the printheads 24, 42 with respect to the axis 28. For purposes of this disclosure, the relative orientation "horizontal" refers to an orientation generally perpendicular to the surface of the drawing sheet that includes FIG. 1 and to an orientation generally parallel with the side edges of the drawing sheet that includes FIG. 2. The relative orientation "vertical" refers to an orientation that lies in the plane of the drawing sheet and is generally parallel with the side edges of the drawing sheet that includes FIG. 1. A vertical orientation as used herein is substantially parallel with the direction in which gravity acts on an object.

The outer surface 26 of the cylindrical member 22 in the embodiment shown is parallel with the axis 28. While the axis 28 of cylindrical member 22 is shown horizontally aligned in FIG. 1 and in the partial section cut of FIG. 2, other orientations of the axis 28 are possible, such as a vertical orientation or an orientation between the horizontal and vertical orientations. Although FIG. 2 shows the printer 100 with one partial-width printhead 24 to the right of the axis 28 and two cross-process-spaced, partial-width printheads 42 to the left of the axis 28, the printer 100 can include any number and combination of partial-width and full-width printheads to form the three-dimensional object. The z-direction 40 in the embodiment shown is perpendicular to the axis 28 and the outer surface 26 of the cylindrical member 22. In other embodiments, the z-direction 40 is oblique to the axis 28 and the outer surface 26 of the cylindrical member 22.

The printer 100 further includes a monitoring system for determining the cumulative position and the periodic average velocity of the cylindrical member 22 as the first driver 34 rotates the cylindrical member 22 about the axis 28. As shown in FIG. 1, the monitoring system includes a position encoder 44 operatively connected to the cylindrical member 22. The encoder 44 is configured to generate a series of periodic signals indicative of the rotation of the cylindrical member 22 about the axis 28. The monitoring system also includes a high frequency clock configured to generate clock pulses at a frequency greater than the maximum frequency of the encoder signal, and a timer for controlling the total time of a predetermined sample interval. The monitoring system also includes a counter for accumulating the number of integral encoder signal cycles completed and an arithmetic logic unit configured to determine the size of a fractional portion of an encoder signal cycle completed between the last integral encoder cycle and the end of the sample interval.

The rotational velocity of the cylindrical member 22 is determined by computing the sum of the number of integral encoder signal cycles and any fractional portion of an encoder cycle and dividing the sum by the predetermined sample interval. The cumulative position of the cylindrical member 22 is determined by multiplying the sum of the number of integral encoder signal cycles and any fractional portion of an encoder cycle by an encoder position conversion factor. Further details of the system for determining the cumulative position and the periodic average velocity of a rotating body are found in U.S. Pat. No. 5,237,521 to Raj et al., the disclosure of which is herein incorporated by reference in its entirety. In some embodiments, a lookup correction calibration is added to the encoder signals to compensate for repeatable cyclic eccentricities due to rotational variations or known calculable variations due to the construction of the object.

Referring to FIG. 1 and FIG. 2, the printer 100 in one embodiment further includes at least one gap sensor 46 configured to generate a signal indicative of a gap between the sensor 46 and the layer of ejected material most distant from the outer surface 26 of cylindrical member 22. The sensor 46 in the embodiment shown in the figures is positioned flush with a print-side surface 48 of the first printhead 24 such that the signal generated by the sensor 46 corresponds to a distance across the gap between the first printhead 24 and the layer of material most distant from the outer surface 26. The sensor 46 in another embodiment is spaced a known distance from the print-side surface 48 of the printhead. This arrangement enables the distance across the gap between the first printhead 24 and the layer of material most distant from the outer surface 26 to be determined from the signal generated by the sensor 46 and the known spacing of the sensor 46 from the print-side surface 48. The gap sensor 46 in some embodiments is a contact sensor and in other embodiments is non-contact sensor.

The printer 100 further includes a second driver 50 operatively connected to the frame 20 to move the frame 20 between the first position and the second position. The second driver 50 in one embodiment moves at least one rotatable end clamp 52 of the frame 20 relative to the cylindrical member 22 such that the end clamp 52 is engageable with the cylindrical member 22 in the first position and spaced from the cylindrical member 22 in the second position. In this embodiment, an inner diameter of the end clamp 52 covers a portion of the outer surface 26 of the cylindrical member 22 when the frame 20 is in the first position to axially support the cylindrical member 22 for rotation about the axis 28. In the second position, the end clamp 52 is spaced from the cylindrical member 22 so that the cylindrical member 22 is transferable to and from the frame 20.

In another embodiment, the end clamp includes a protrusion that engages a concentric bore formed in the cylindrical member 22 to axially support the cylindrical member 22 for rotation about the axis 28. In another embodiment, the first driver 34 is operatively connected to the end clamp and configured to rotate the end clamp such that the end clamp both supports and rotates the cylindrical member 22 about the axis 28 when the frame 20 is in the first position. Although specific embodiments having a releasable support for rotation of the cylindrical member 22 about the axis 28 have been shown and described, the printer 100 can include any structure that rotatably supports the cylindrical member 22 in one position and that enables transfer of the cylindrical member 22 in another position.

Figure 3:
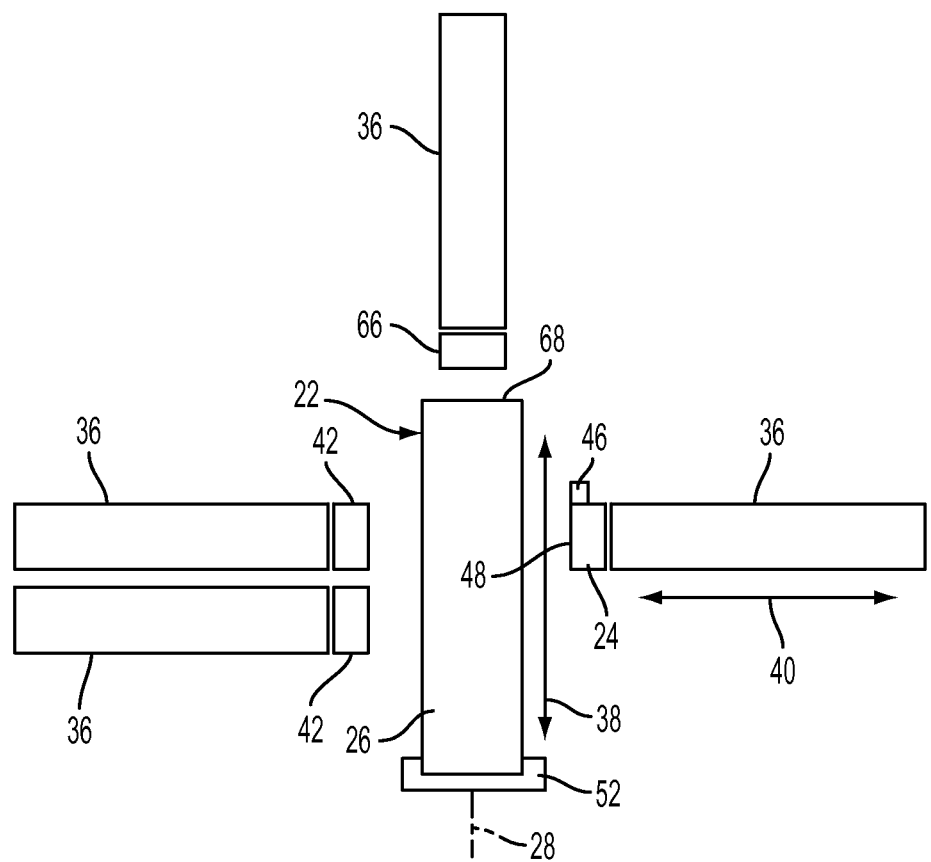
FIG. 3 shows the partial section cut of FIG. 2 modified to illustrate an embodiment of the printer that includes an axial printhead.

FIG. 3 shows the partial section cut of FIG. 2 modified to illustrate an embodiment of the printer 100 that includes an axial printhead 66. The axial printhead 68 is positioned to eject material onto an end face 68 of the cylindrical member 22 to extend layers of ejected material past the end of the cylindrical member 22. As shown in the figure, the axial printhead 66 ejects material in a direction parallel with the axis 28 of the cylindrical member 22. The frame 20 of the printer 100 in this embodiment supports one end of the cylindrical member so that the axial printhead 66 can eject material onto the entire surface of the end face 68 on the unsupported end of the cylindrical member 22. In some embodiments, the axial printhead 66 is a full-width printhead configured to cover the entire end face 68 of the cylindrical member 22 and, in other embodiments, the axial printhead 66 is a partial-width printhead positioned to cover only a portion of the end face 68 of the cylindrical member 22. The axial printhead 66 in some embodiments is moveable in an axial direction (in the direction of the cross-process direction 38 in FIG. 3) and an axial cross-process direction (in the direction of the z-direction 40 in FIG. 3).

Operation and control of the various subsystems, components and functions of the printer 100 are performed with the aid of a controller 54 and memory. In particular, the controller 54 monitors the velocity and position of the substrate and determines the timing of material ejection from the one or more printheads 24, 42. The controller 54 can be implemented with general or specialized programmable processors that execute programmed instructions. The controller 54 is operatively connected to the memory to enable the controller 54 to read instructions and to read and write data required to perform the programmed functions in the memory. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The controller 54 is operatively connected to the first printhead 24, the first driver 34, the second driver 50, the third driver 36, the encoder 44, and the sensor 46. The controller 54 is configured to execute programmed instructions stored in the memory to operate the three-dimensional printer 100 to generate a three-dimensional object. The controller 54 operates the first driver 34 to rotate the cylindrical member 22 at a constant angular velocity. In the embodiment of the printer 100 shown in the figures, all positions on the outer surface 26 of the cylindrical member 22 are located at approximately the same distance from the axis 28, so the surface velocity at any position across the outer surface 26 is the same.

The controller 54 operates the first printhead 24 to eject material onto the outer surface 26 as the first driver 34 rotates the outer surface 26 past the first printhead 24 at the constant angular velocity. The first printhead 24 can be operated selectively or continuously to build the layers of material on the outer surface 26 to generate the three-dimensional object. The controller 54 uses the interpolated and/or corrected encoder signals from the monitoring system to selectively operate the printheads 24, 42 as a function of the angular position of the outer surface 26. The controller 54 also uses the interpolated encoder signals to adjust the angular velocity of the cylindrical member 22 as the printer 100 is operated to form the three-dimensional object. The angular velocity of the cylindrical member 22 can be adjusted to compensate for the increasing mass of the material on the cylindrical member 22 as multiple layers of material are ejected onto the outer surface 26 of the cylindrical member 22. The angular velocity can also be adjusted to compensate for the increasing surface velocities at the material layers as the multiple layers of material are deposited further from the outer surface 26 of the cylindrical member 22.

The controller 54 in one embodiment selectively operates the first printhead 24 to eject material onto the outer surface 26 of the cylindrical member 22 after one or more rotations of the cylindrical member 22 to enable hardening of the layer or layers of material ejected from the printhead. In another embodiment, the controller 54 operates the first driver 34 to temporarily stop or pause the rotation of the cylindrical member 22 to enable hardening or curing of the recently ejected material. In another embodiment, a laser sintering process is implemented to cure the recently ejected material before a subsequent layer is ejected from the first printhead 24.

The controller 54 operates or fires the first printhead 24 at an approximately constant frequency driven by a digital image of the object to be formed on the outer surface 26 and modulated by the encoder 44. In one embodiment, the controller 54 operates the printhead at a frequency of approximately 39 kilohertz. In other embodiments, the controller 54 operates the printhead at a frequency that is greater or less than 39 kilohertz. The selection of a printhead operating frequency typically depends upon a number of system parameters, including, but not limited to, the complexity and/or size of the three-dimensional object to be produced, the size of the substrate and/or printer used to generate the three-dimensional object, and the properties and characteristic of the material or materials used to build the layers of the three-dimensional object.

The digital image used by the controller 54 to operate the first printhead 24 in one embodiment is derived from an object design file based in an x-y coordinate system. The controller 54 in this embodiment translates the x-y coordinate values to cylindrical coordinates and deconstructs the object into a set of layers. The controller 54 unwraps each of the deconstructed layers into respective planes. To maintain a consistent resolution while forming the object, the controller 54 maps a different number of scanlines to each layer based on the length of the layer in the unwrapped plane. In one embodiment, the first layer of an object has a radius of 5 mm from the axis 28. The circumference of 31.4 mm at this layer position results in 742 scanlines around the object at 600 dpi. At a subsequent layer position, the object has a radius of 10 mm and a circumference of 62.8 mm. The circumference at the subsequent layer position results in 1484 scanlines around the object to form a single layer at 600 dpi. While the first layer and the subsequent layer are different in length, the controller 54 operates the first printhead 24 at a constant frequency to form the layers by adjusting the angular velocity of the cylindrical member 22 to maintain a constant surface velocity at the radius of each layer.

The controller 54 identifies a radial distance of each layer of material from the axis 28 to regulate the angular velocity of the cylindrical member 22 and to adjust the position of the first printhead 24 in the z-direction 40. The controller 54 in one embodiment estimates the radial distance based on the position, the amount, and the properties of the material ejected onto the outer surface 26 of the cylindrical member 22. In another embodiment, the controller 54 identifies the radial distance of the layer of material most distant from the outer surface 26 of the cylindrical member 22 with reference to the signal generated by the gap sensor 46. As discussed above with reference to FIG. 1 and FIG. 2, the gap sensor 46 in one embodiment is secured to the first printhead 24 such that movement of the printhead also moves the sensor 46. In other embodiments, the gap sensor 46 is secured to the frame 20 such that the distance from the sensor 46 to the axis 28 of the cylindrical member 22 remains constant. In all embodiments that implement the gap sensor 46, the position of the sensor 46 with reference to the axis 28 or the outer surface 26 of the cylindrical member 22 is calibrated as a reference position and stored in memory.

The controller 54 operates the third driver 36 with reference to the identified radial distance to move the first printhead 24 in the z-direction 40 to maintain a predetermined gap between the first printhead 24 and the layer of ejected material most distant from the substrate. The predetermined gap enables the controller 54 to maintain consistent conditions for the printer 100 to form the three-dimensional object. The predetermined gap enables the controller 54 to eject the material from the first printhead 24 with a predictable flight time from the first printhead 24 to the outer surface 26 of the cylindrical member 22 or to existing layers of material. The predetermined gap also enables the controller 54 to account for air entrained from the rotating object. The predetermined gap further prevents a collision from occurring when the material already ejected onto the outer surface 26 is moved past the first printhead 24. In one embodiment, the third driver 36 is embodied as a stepper motor that is operated by the controller 54 with reference to one or more of the interpolated encoder output and the gap sensor 46. The motion of the printhead in the z-direction 40 is smooth or continuous during the rotation of the outer surface 26 of the cylindrical member 22 in some embodiments. In other embodiments, the motion of the printhead in the z-direction 40 is in discrete movements, for example, a translation of the printhead occurs after each completed rotation of the outer surface 26 of the cylindrical past the printhead.

The controller 54 in some embodiments operates the third driver 36 to move the first printhead 24 relative to the outer surface 26 of the cylindrical member 22 in the cross-process direction 38. The cross-process movement enables the first printhead 24 to eject material at higher cross-process resolutions than possible with printheads that are fixed in the cross-process direction 38. In some embodiments, the motion of the first printhead 24 in the cross-process direction 38 is smooth or continuous during the rotation of the outer surface 26. The motion of the first printhead 24 in the cross-process direction 38 in other embodiments is in discrete movements, for example, a translation of the printhead occurs after each completed rotation of the outer surface 26 past the movable printhead. In yet further embodiments, the motion of the printhead in the cross-process direction 38 includes a combination of continuous or spiral movements and discrete movements such that the printhead forms a uniform continuous ejection along the width of the cylindrical member 22.

In some embodiments in which the first printhead 24 is a partial-width printhead, the controller 54 is further configured to operate the third driver 36 to adjust an angle or tilt of the printhead 24 (in the direction of arrow 41 in FIG. 2) relative to the outer surface 26 of the cylindrical member 22. The movement of the printhead positions a first portion of the printhead face closer to the outer surface 26 while positioning a second portion of the printhead face away from the outer surface 26. The angular adjustability of the printhead 24 enables the controller 54 to adjust the orientation of the printhead to maintain the print-side surface 48 parallel to object layer surfaces that are not parallel to the cylindrical member 22 when viewed along the cross-process direction 38. Such non-parallel surfaces can result during the formation of a conical object on the cylindrical member 22. In some embodiments, the angle of the printhead 24 is continuously adjusted as needed during the formation of the entire three-dimensional object. In other embodiments, the printhead angle is adjusted only for the final layers of the object to improve the surface finish of the surfaces formed by the final layers.

The orientation of the cylindrical member 22, gravity, and the centripetal forces acting on the ejected material are considered when generating the three-dimensional object to avoid object defects, such as feature shift, or the misdirection of ejected material from the printer 100. The consideration of centripetal force is useful because centripetal force changes as additional layers of material are deposited onto the outer surface 26 of the cylindrical member 22. In some embodiments, the controller 54 can implement software mapping algorithms to adjust the pixel positions and/or the timing of the material ejection from the printhead to compensate for object feature shift or misplacement due to the various forces. A finite element model calculation of the object image file is performed in some embodiments to identify adjustments to avoid feature defects.

Figure 4:
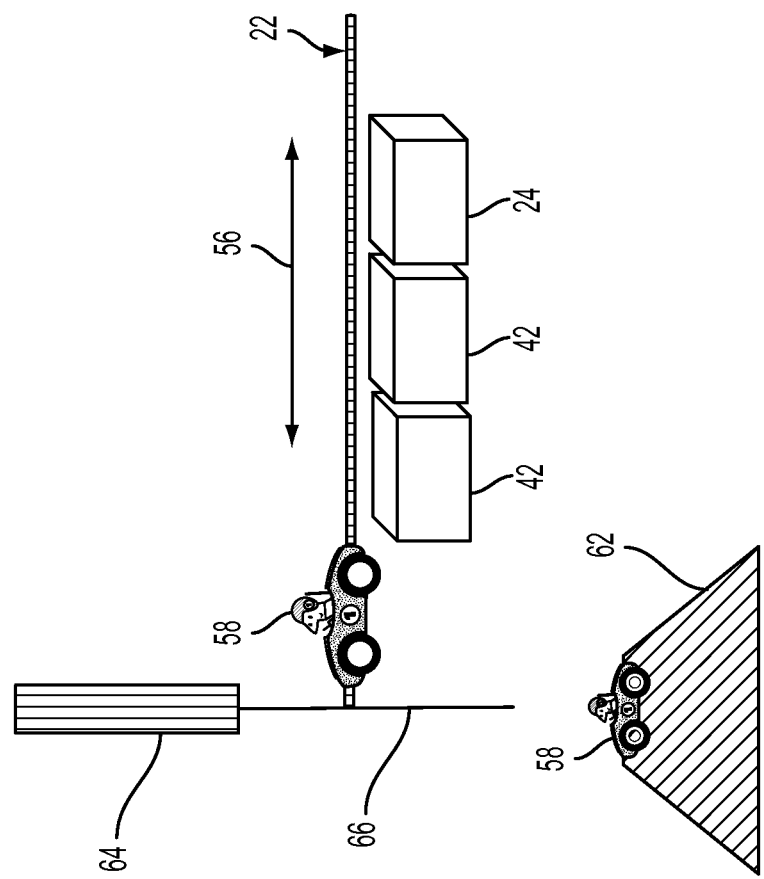
FIG. 4 is a partial perspective side view of the printer of FIG. 1 illustrating the transfer of the substrate to and from the printer in a first transfer direction.
Figure 5:
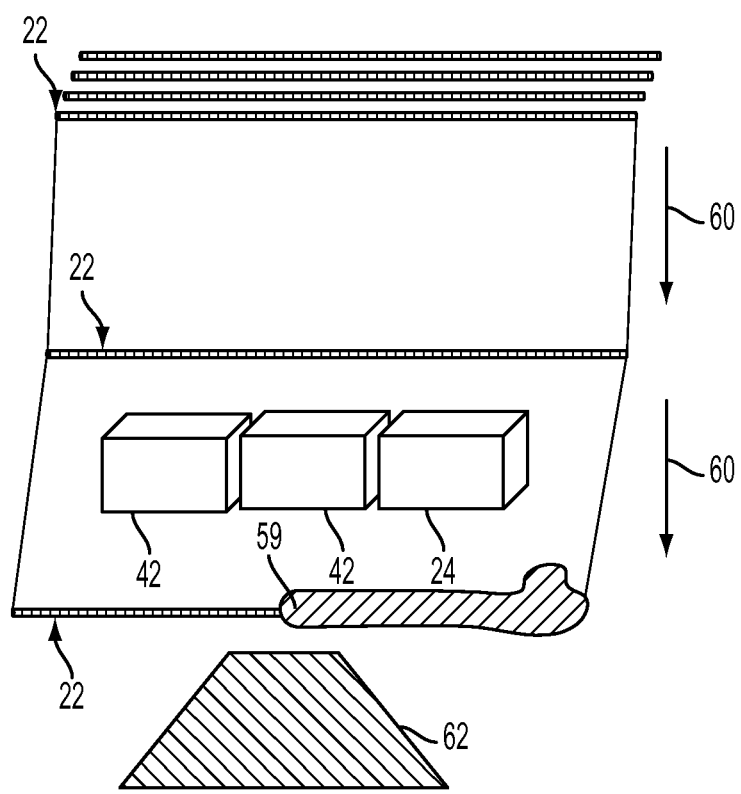
FIG. 5 is a partial perspective side view of the printer of FIG. 1 illustrating the transfer of the substrate to and from the printer in a second transfer direction.

FIG. 4 and FIG. 5 show partial perspective side views of the printer 100 of FIG. 1 to illustrate different methods of transferring the cylindrical member 22 to and from the printer 100. For simplicity, FIG. 4 and FIG. 5 show a single line of partial-width printheads 24, 42 adjacent to the cylindrical member 22. FIG. 4 depicts an embodiment in which the cylindrical member 22 is transferred to and from the printer 100 in a first transfer direction 56 that is parallel to and substantially concentric with the axis 28 of the cylindrical member 22. The controller 54 in this embodiment operates the second driver 50 to move the frame 20 to the second position to receive the cylindrical member 22. The cylindrical member 22 can be transferred to the frame 20 in the first transfer direction 56 by a conveyor belt system, a robotic arm, a manual transfer by an operator, or by any known material transfer method. Once the cylindrical member 22 is received in the frame 20, the controller 54 operates the second driver 50 to move the frame 20 to the first position to rotatably support the cylindrical member 22 along the axis 28. After the printer 100 forms the three-dimensional object 58, the controller 54 operates the second driver 50 to move the frame 20 to the second position to enable the cylindrical member 22 to be removed from the frame 20.

FIG. 5 depicts an embodiment in which the cylindrical member 22 is transferred to and from the printer 100 in a second transfer direction 60 that moves from a position above the printer 100 to a position below the printer 100. Similar to the embodiment of FIG. 4, the frame 20 is placed in the second position to receive and remove the cylindrical member 22, and the frame 20 is placed in the first position to rotatably support the cylindrical member 22 along the axis 28. In one embodiment, an incoming cylindrical member 22 is grabbed from above the printer 100 and placed along the axis 28. In another embodiment, the cylindrical member 22 is rotated from above the printer 100 and dropped into place along the axis 28 by gravity. After the printer 100 forms the three-dimensional object 59, the controller 54 operates the second driver 50 to move the frame 20 to the second position to enable the cylindrical member 22 to be removed from the frame 20.

FIG. 4 and FIG. 5 further depict different implementations of the cylindrical member 22. The cylindrical member 22 in the embodiment of FIG. 4 is implemented as a carrier substrate and does not form a portion of the finished three-dimensional object 58. The cylindrical member 22 in this embodiment can be a solid-core member, a hollow-core or shell member, or a sleeve member affixed to the solid-core member or the hollow-core member. In one embodiment in which the cylindrical member 22 is implemented as a carrier substrate, the material layers are ejected onto a flexible covering, such as a large sheet of plastic that is secured around the outer surface 26 of the cylindrical member 22. The flexible covering and the affixed three-dimensional object 58 are removed from the cylindrical member 22 at the end of production. The cylindrical member 22 in the embodiment of FIG. 5 is implemented as a base substrate and forms an integral portion of the finished three-dimensional object 59. In one embodiment in which the cylindrical member 22 is implemented as a base substrate, the cylindrical member 22 is a solid-core titanium rod onto which a hydroxyapatite ceramic material is ejected to form an artificial bone 59. The titanium rod and the hydroxyapatite ceramic material ejected onto the titanium rod form the composite structure of the artificial bone 59.

Referring still to FIG. 4 and FIG. 5, the printer 100 can include a transport mechanism 62 configured to receive one or more of the cylindrical members 22 after the three-dimensional object 58, 59 has been formed on the cylindrical member 22. In some embodiments, the printer 100 includes a laser device 64 (FIG. 3) configured to direct a laser beam 66 at the cylindrical member 22 to remove the formed object 58 from the cylindrical member 22.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional printer comprising:
   a cylindrical member having an outer surface;
   a frame having a mechanism that is configured to move between a first mechanism position at which the mechanism engages the cylindrical member so the frame rotatably supports the cylindrical member and a second mechanism position at which the mechanism is spaced from the cylindrical member to enable transfer of the cylindrical member to and from the frame;
   a first printhead mounted on the frame to enable the first printhead to eject material onto the outer surface of the cylindrical member;
   a first driver operatively connected to the cylindrical member to rotate the outer surface past the first printhead;
   a second driver operatively connected the mechanism of the frame to move the frame between the first mechanism position and the second mechanism position;

a third driver operatively connected to the first printhead, the third driver being configured to move the first printhead relative to the outer surface of the cylindrical member;

a sensor configured to generate a signal indicative of a gap between the sensor and a layer of elected material most distant from the outer surface of the cylindrical member; and a controller operatively connected to the first printhead, the first driver, the second driver, the third driver, and the sensor, the controller being configured to:

operate the first driver to rotate the cylindrical member;

operate the first printhead to eject material onto the outer surface of the cylindrical member and build layers of material on the cylindrical member as the outer surface rotates past the first printhead;

operate the second driver to move the mechanism of the frame between the first mechanism position and the second mechanism position selectively;

operate the third driver to move the first printhead from a first printhead position to a second printhead position relative to the outer surface of the cylindrical member;

identify a radial distance from an axis of the cylindrical member to the layer of elected material most distant from the outer surface of the cylindrical member with reference to the signal generated by the sensor; and operate the first driver to adjust rotation of the cylindrical member with reference to the identified radial distance to maintain a predetermined angular velocity at the layer of elected material most distant from the outer surface of the cylindrical member.

2. The three-dimensional printer of claim 1, the third driver being further configured to move the first printhead from the first printhead position to the second printhead position in a direction perpendicular to the outer surface of the cylindrical member.

3. The three-dimensional printer of claim 2, the controller being further configured to operate the third driver to move the first printhead from the first printhead position to the second printhead position in one or more of (i) a continuous motion during a rotation of the cylindrical member and (ii) at least one discrete movement after one or more rotations of the cylindrical member.

4. The three-dimensional printer of claim 1, the third driver being further configured to move the first printhead from the first printhead position to the second printhead position in a direction parallel to the outer surface of the cylindrical member.

5. The three-dimensional printer of claim 4, the controller being further configured to operate the third driver to move the first printhead from the first printhead position to the second printhead position in one or more of (i) a continuous motion during a rotation of the cylindrical member and (ii) at least one discrete movement after one or more rotations of the cylindrical member.

6. The three-dimensional printer of claim 1 further comprising:

a position encoder operatively connected to the cylindrical member, the position encoder being configured to generate an alternating signal as a function of a rotational position of the cylindrical member, the controller being operatively connected to the position encoder and further configured to:

sum a number of integral cycles and fractional cycles of the alternating signal that are generated over a predetermined period, identify a rotational velocity of the cylindrical member with reference to integral and fractional cycles of the alternating signal over the predetermined period, identify a position of the cylindrical member with reference to the integral and fractional cycles of the alternating signal and a conversion factor, and operate the first printhead to eject the material onto the outer surface of the cylindrical member with reference to the identified rotational velocity and the identified position of the cylindrical member.

7. The three-dimensional printer of claim 6, the controller being further configured to:

adjust a rotation of the cylindrical member with reference to the identified rotational velocity and the identified position of the cylindrical member.

8. The three-dimensional printer of claim 1, the controller being further configured to:

operate the third driver to move the first printhead from the first printhead position to the second printhead position in a direction perpendicular to the outer surface of the cylindrical member with reference to the identified radial distance to maintain a predetermined gap between the first printhead and the layer of ejected material most distant from the outer surface of the cylindrical member.

9. The three-dimensional printer of claim 1 further comprising:

a second printhead mounted on the frame, the controller operatively connected to the second printhead and configured to operate the second printhead to eject material onto the outer surface of the cylindrical member.

10. The three-dimensional printer of claim 9, wherein the second printhead is spaced from the first printhead in a circumferential direction defined by the rotation of the cylindrical member.

11. The three-dimensional printer of claim 9, wherein the second printhead is positioned adjacent to the first printhead to arrange the printheads in a direction parallel to the outer surface of the cylindrical member.

12. The three-dimensional printer of claim 1, the controller being further configured to:

selectively operate the first printhead to eject material onto the outer surface of the cylindrical member after one or more rotations of the cylindrical member to enable hardening of a layer of ejected material on the outer surface of the cylindrical member.

13. The three-dimensional printer of claim 1, the mechanism of the frame being further configured to enable transfer of the cylindrical member to and from the frame in a direction parallel to an axis about which the cylindrical member is rotated.

14. The three-dimensional printer of claim 1, the mechanism of the frame being further configured to enable transfer of the cylindrical member to and from the frame in a direction oblique to an axis about which the cylindrical member is rotated to receive material from the first printhead.

15. The three-dimensional printer of claim 1, the three-dimensional printer further comprising:

a third printhead mounted on the frame to enable the third printhead to eject material onto an end face of the cylindrical member, the controller being operatively connected to the third printhead and configured to operate the third printhead to eject material onto the end face of the cylindrical member.

16. The three-dimensional printer of claim 1, wherein the cylindrical member and the layers of material built on the cylindrical member form a composite object.

17. The three-dimensional printer of claim 1, wherein the layers of material built on the cylindrical member form an object that is removable from the cylindrical member.

18. The three-dimensional printer of claim 1, the third driver being further configured to rotate the first printhead from the first printhead position to the second printhead position to move a first portion of a face of the printhead closer to the cylindrical member and to move a second portion of the face of the printhead away from the cylindrical member.

* * * * *